(12) United States Patent
Blodgett

(10) Patent No.: US 11,113,073 B2
(45) Date of Patent: Sep. 7, 2021

(54) DUAL MODE HARDWARE RESET

(71) Applicant: Micron Technology, Inc., Boise, ID (US)

(72) Inventor: Greg A. Blodgett, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 148 days.

(21) Appl. No.: 16/425,127

(22) Filed: May 29, 2019

(65) Prior Publication Data

US 2020/0379778 A1    Dec. 3, 2020

(51) Int. Cl.
*G06F 9/4401* (2018.01)
*G06F 13/16* (2006.01)
*G06F 1/3296* (2019.01)
*G06F 3/06* (2006.01)

(52) U.S. Cl.
CPC .......... *G06F 9/4418* (2013.01); *G06F 1/3296* (2013.01); *G06F 3/0625* (2013.01); *G06F 3/0634* (2013.01); *G06F 3/0679* (2013.01); *G06F 13/1668* (2013.01)

(58) Field of Classification Search
CPC .. G06F 13/1668; G06F 1/3296; G06F 9/4418; G06F 3/0625; G06F 3/0634; G06F 3/0679
See application file for complete search history.

(56) References Cited

U.S. PATENT DOCUMENTS

| 6,650,594 B1* | 11/2003 | Lee .................. G11C 5/147 365/194 |
| 8,832,475 B1* | 9/2014 | Sheets .............. G06F 1/3287 713/310 |
| 9,229,525 B2 | 1/2016 | Reller et al. |
| 9,304,579 B2 | 4/2016 | Ware et al. |
| 9,846,471 B1* | 12/2017 | Arora ............... G06F 1/3206 |
| 2016/0154452 A1* | 6/2016 | Hansson ........... G06F 1/3275 713/323 |
| 2019/0034106 A1* | 1/2019 | Shin ................ G06F 13/1668 |

FOREIGN PATENT DOCUMENTS

WO    2019022952    1/2019

* cited by examiner

*Primary Examiner* — Nimesh G Patel
(74) *Attorney, Agent, or Firm* — Schwegman Lundberg & Woessner, P.A.

(57) ABSTRACT

Systems and methods are disclosed, including selectively providing one of a first reset or a second reset to transition to a storage system from a low power mode to an operational power mode in response to a hardware reset signal and a value of a control bit on the storage system.

22 Claims, 6 Drawing Sheets

| | VCC | VCCQ | VCCQ2 | I/F | SRAM | WAKE LATENCY | POWER SAVINGS |
|---|---|---|---|---|---|---|---|
| SLEEP | OFF | ON | ON | ON | 50% | 1X | 1Z |
| DEEP SLEEP_0 | OFF | ON | ON | OFF | 50% | 1X+A | 1Z+H |
| DEEP SLEEP_1 | OFF | ON | ON | OFF | 30% | 1X+B | 1Z+I |
| DEEP SLEEP_2 | OFF | ON | ON | OFF | 20% | 1X+C | 1Z+J |
| DEEP SLEEP_3 | OFF | ON | ON | OFF | 10% | 1X+D | 1Z+K |
| POWER OFF | OFF | OFF | OFF | OFF | 0% | 1Y | 1P |

FIG. 2

DUAL MODE HARDWARE RESET

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems (e.g., hosts) typically include a host processor, a first amount of host memory (e.g., main memory, often volatile memory, such as DRAM) to support the host processor, and one or more storage systems (e.g., often non-volatile memory, such as flash memory) that provide additional storage to retain data in addition to or separate from the main memory.

A storage system (e.g., a solid-state drive (SSD), a universal flash storage (UFS) device, etc.) can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, byway of example, but not byway of limitation, various embodiments discussed in the present document.

FIG. 2 illustrates example table illustrating different parameters and resulting wake latency and power savings for different storage system configurations.

DETAILED DESCRIPTION

Figure 1:
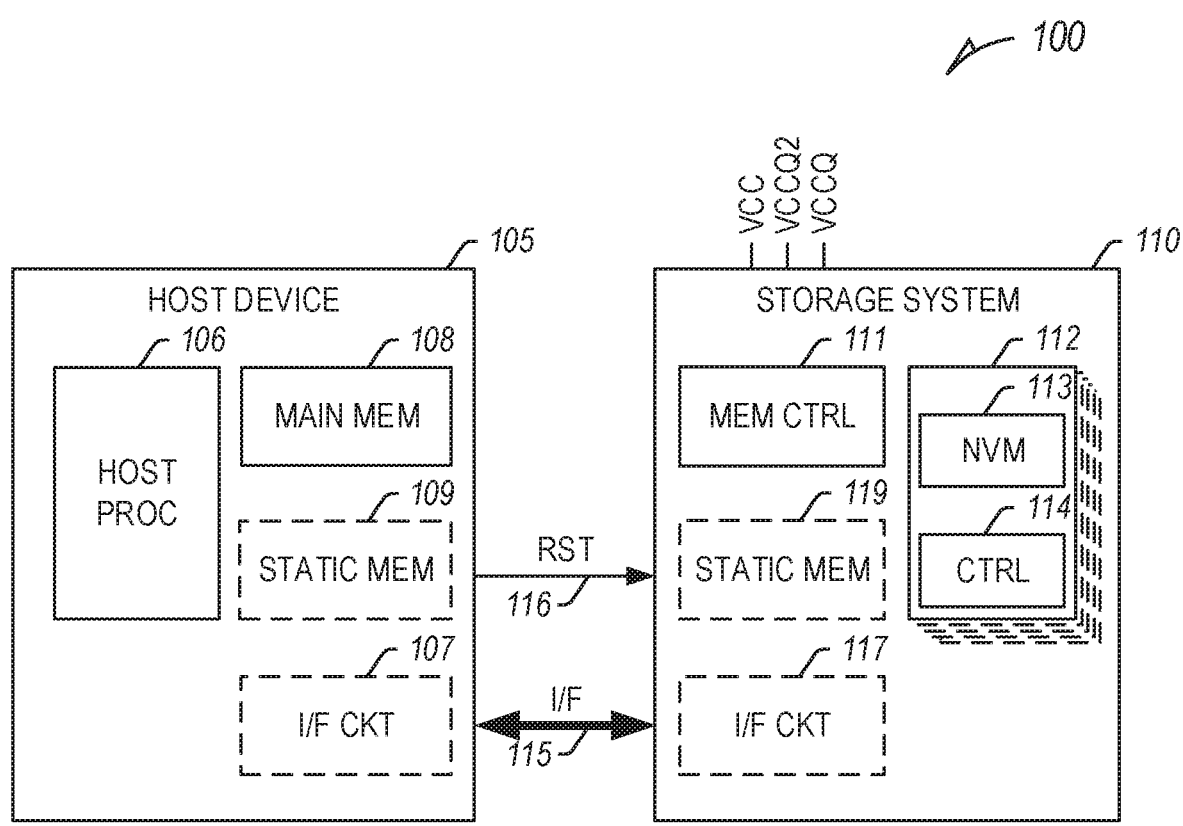
FIG. 1 illustrates an example host system including a host device and a storage system.

Modern host systems, including a host device, a storage system, and a communication interface, have different power modes, including, for example, a normal (e.g., active) mode, one or more levels of power-saving modes, such as a sleep mode, and an off mode. In various sleep modes, certain system resources are powered down to save power, but the communication interface can remain active or in a reduced power state (above power down). Further, many host systems share power rails throughout the system, preventing power removal from the storage system alone, thus limiting power savings. Accordingly, host systems may additionally include other power modes, such as a deep sleep mode configured to allow the host system to power down most or all of the communication interface between the storage system and a host device to further reduce power consumption of the host system, such as in contrast to the sleep mode.

For example, in UFS systems, the deep sleep mode can cease communication between the host device and the storage system on the upstream and downstream lanes of the communication interface (e.g., DIN_t, DIN_c and DOUT_t, DOUT_c, respectively), but maintain a unidirectional hardware (HW) reset signal interface from the host device to the storage system separate from the upstream and downstream lanes.

When in the deep sleep mode, a power cycle or hardware reset signal may be required to return the storage system or the communication interface to the normal mode. The host device traditionally controls the deep sleep mode. Because the host cannot monitor the storage system while the communication interface is powered down, at a return to normal mode, the host device can re-initialize the storage system to place it in a known state to continue normal operation. Such traditional re-initialization takes a certain amount of time.

The present inventors have recognized, among other things, that a control bit (e.g., of a flag, an attribute, a register, a descriptor, or other data structure of the memory device or storage system, etc.) at the storage system can be added or an existing bit be adapted and used to allow the hardware reset function to provide multiple (e.g., dual) behaviors at the storage system, such as a first, full reset (e.g., a traditional, full re-initialization, etc.) and a second, modified reset (e.g., a modified initialization, etc.) faster than the first.

The control bit (e.g., a hardware reset bit) can be stored in the storage system and controlled by the host device during normal operation, such as prior to entering deep sleep mode. Once a command to enter the deep sleep mode is received at the storage system from the host device (e.g., disabling the communication interface), the control bit can be controlled by the storage system. When the host device provides an instruction for the communication interface to resume the normal mode, such as using the hardware reset signal, the storage system can control re-initialization, waking more quickly than a traditional power cycle or hardware reset and re-initialization.

If the control bit is not set (e.g., if the bit value is "0"), storage system operation can be normal, including performing a traditional hardware reset when resuming to the normal mode. The traditional hardware reset can trigger re-initialization of the storage system, load (or reload) all firmware, reset the memory controller, perform a full initialization of the one or more memory devices, etc. Powering down as many non-essential aspects of the storage system as possible offers the most power savings, but also more re-initialization time or latency when waking up or resuming to the normal mode.

In contrast, if the control bit is set (e.g., if the bit value is "1"), storage system operation can enter a modified operation resumption mode configured to reduce initialization latency of the traditional (or "normal") hardware reset mode for resuming after deep sleep power mode. If power has not been removed from the system (e.g., if one or more power signals are retained above a threshold), one or more components of the storage system may not need full re-initialization to resume operation. When resuming from a deep sleep mode in which some power was retained (e.g., one or more of VCC, VCCQ, or VCCQ2 are retained, removed, or combinations thereof, or if one or more voltage regulators or charge pumps are disabled, etc.), the one or more memory devices or the memory controller may not need full re-initialization, although in certain examples (e.g., a supply voltage below a threshold, etc.), static memory (e.g., SRAM) of the storage system may need to be reloaded. In other examples, some power domains (e.g., voltage levels, regulators, charge pumps, etc.) disabled during deep sleep mode may need to be powered back on. A tradeoff exists between power savings and latency; the more power retained/used during deep sleep mode, the faster the wake-up time to resume the normal mode.

If power is lost, or if a power level drops below a threshold operating level, the control bit can be reset (e.g., to a bit value of "0", etc.), so that a traditional hardware reset function will be triggered when returning to the normal mode. If the storage system was not fully cycled and re-initialized, but the host device requires a full storage system reset, the host device can re-assert the hardware reset signal after the storage system wakes up from the deep sleep mode to initiate a full reset.

Although described herein with respect to a UFS and NAND system, other types of storage systems or memories, such as 3D XPoint memory, Ferro-electric memory (FeRAM, or in some embodiments known as hybrid RAM, HRAM) with faster wake-times than NAND (e.g., 3D NAND), may benefit even greater than the UFS system described herein, resulting in an even more significant time savings as a percentage of the total wake-up time.

FIG. 1 illustrates an example system (e.g., a host system) 100 including a host device 105 (e.g., a UFS host) and a storage system 110 (e.g., a UFS device) configured to communicate over a communication interface (I/F) 115 (e.g., a bidirectional parallel or serial communication interface, such as a UFS interface). In an example, the communication interface 115 can be referred to as a host interface. The host device 105 can include a host processor 106 (e.g., a host central processing unit (CPU) or other processor or processing circuitry, such as a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.), including, for example upstream and downstream lanes (e.g., DIN_t, DIN_c and DOUT_t, DOUT_c, respectively). The UFS device can further include a unidirectional reset signal interface (RST) 116, such as a hardware reset signal interface from the host device 105 to the storage system 110.

In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111 and a non-volatile memory device 112. The memory controller 111 can optionally include a limited amount of static memory 119 to support operations of the memory controller 111. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115. Control circuitry, as used herein, can refer to one or more of the memory controller 111, the device controller 114, or other periphery circuitry in the storage system 110, the NVM device 112, etc.

Flash memory devices typically include one or more groups of one-transistor, floating gate (FG) or replacement gate (RG) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, FeRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces between the storage system and a host device. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate (FG) or replacement gate (RG) (or charge trapping) storage structures can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100, such as a memory manager, one or more memory management tables, etc.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager 125 can parse or format host commands (e.g., commands received from the host device 105) into device commands (e.g., commands associated with operation of a memory array, etc.), or generate device commands (e.g., to accomplish various memory management functions) for the device controller 114 or one or more other components of the storage system 110.

The memory manager can include a set of management tables configured to maintain various information associated with one or more component of the storage system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce storage system 110 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512B) as well as a number of bytes (e.g., 32B, 54B, 224B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

One or more of the host device 105 or the storage system 110 can include interface circuitry, such as host interface circuitry (I/F CKT) 107 or storage interface circuitry (I/F CKT) 117, configured to enable communication between components of the host system 100. Each interface circuitry can include one or more UFS Interconnect (UIC) layers. In certain examples, the host I/F CKT 107 can include a controller (e.g., a UFS controller), a driver circuit (e.g., a UFS driver), etc.

Components of the host system 100 can be configured to receive or operate using one or more host voltages, including, for example, VCC, VCCQ, and, optionally, VCCQ2. VCC can be a first supply voltage (e.g., 2.7V-3.3V, 1.7V-1.95V, etc.). In an example, one or more of the static memory 119 or the non-volatile memory devices 112 can require VCC for operation. VCCQ can be a second supply voltage, lower than the VCC (e.g., 1.1V-1.3V, etc.). In an example, one or more of the memory controller 111, the communication interface 115, or memory I/O or other low voltage blocks can optionally require VCCQ for operation. VCCQ2 can be a third supply voltage between VCC and VCCQ (e.g., 1.7V-1.95V, etc.). In an example, one or more of the memory controller 111 of the communication interface, or other low voltage block can optionally require VCCQ2. In certain examples, in deep sleep mode, VCC (and optionally VCCQ2) can be removed, leaving VCCQ enabled.

FIG. 2 illustrates example table 200 illustrating different parameters and resulting wake latency and power savings for different storage system configurations 200. Although described above as a single bit, in certain examples, the control bit can include multiple control bits to indicate one or more different deep sleep, wake-up, resume, or re-initialization configurations, such as to select between different deep sleep modes with varying combinations of power savings and wake latency in response to the hardware reset signal. The multiple control bits can include multiple flags or multiple bits of one or more registers, descriptors, etc. In an example, 1 bit can represent two configurations, 2 bits can represent up to 4 configurations, 3 bits up to 8 configurations, etc.

In an example, the storage system can include multiple deep sleep modes, including first through fourth deep sleep modes (e.g., DEEP SLEEP_0-DEEP SLEEP_3). The table 200 illustrates example deep sleep modes in contrast to a sleep mode and a power off mode. In an example, a host device can be configured to provide a desired configuration before entering a deep sleep mode, such as using one or more operations over the communication interface. After entering the deep sleep mode, when the communication interface is disabled, the storage system can control the power mode, depending on one or more conditions of the deep sleep mode.

Parameters of the table 200 include different power levels, a status of the communication interface (I/F), and a desired amount of retained static memory (SRAM). The storage system can be configured to maintain or shut down different power levels during different power modes. In all sleep, deep sleep, and power off modes, VCC can be removed, disabled, or placed in an "off" state. In contrast, VCCQ and VCCQ2 can be retained for all but the power off mode, and the communication interface can be disabled for all but the sleep mode. In certain examples, VCCQ2 is omitted from the storage system entirely, and only VCC and VCCQ are used. In other examples, other combinations of VCC, VCCQ or VCCQ2 can be used (e.g., VCC and VCCQ2, and not VCCQ; etc.).

The amount of retained static memory during the sleep or deep sleep modes varies from 50% in the sleep mode and first deep sleep mode, to 10% in the fourth deep sleep mode, and 0% during power off. In other examples, although such parameters illustrate desired parameters, the storage system can be configured to monitor one or more parameter during such deep sleep modes, and alter the mode if one or more of the desired expected parameters is not maintained. Further, such values illustrated above and in table 200 are illustrative and not restrictive, and may include other values in other examples consistent herewith. Further, other circuits or systems can be powered down depending on the desired power mode (e.g., charge pump circuits, voltage regulators, power to specific circuits or groups of circuits, such as a regulator or power supply configured to power storage system I/O circuits, etc.). In other examples, one or more other circuits or groups of circuits providing one or more functions during full or normal operation can be isolated and turned off, depending on the desired power mode.

The wake latency and power savings are generally in opposition to one another. The greater the desired power savings, the greater the wake latency, as more of the static memory, data structures, etc. must be rebuilt or reloaded. In this example, 1P is the highest power savings, with 1P>1Z+

K>1Z+J>1Z+1>1Z+H>1Z. In contrast, 1Y is the greatest wake latency (e.g., the slowest wake time), with 1Y>1X+D>1X+C>1X+B>1X+A>1X.

In other examples, other configurations or number of configurations can be used between, in addition to, or combining one or more of the configurations described herein. The configurations described herein, and the one or more control bits in combination with the hardware reset signal, can provide reduced system cost (e.g., in contrast to more complex solutions requiring further communication or monitoring of one or more components of the host system), a faster wake-up time (reduced latency) from deep sleep mode, power savings (e.g., in contrast to traditional power modes), or combinations thereof. Further, in certain examples, the normal mode can include an idle mode.

Figure 3:
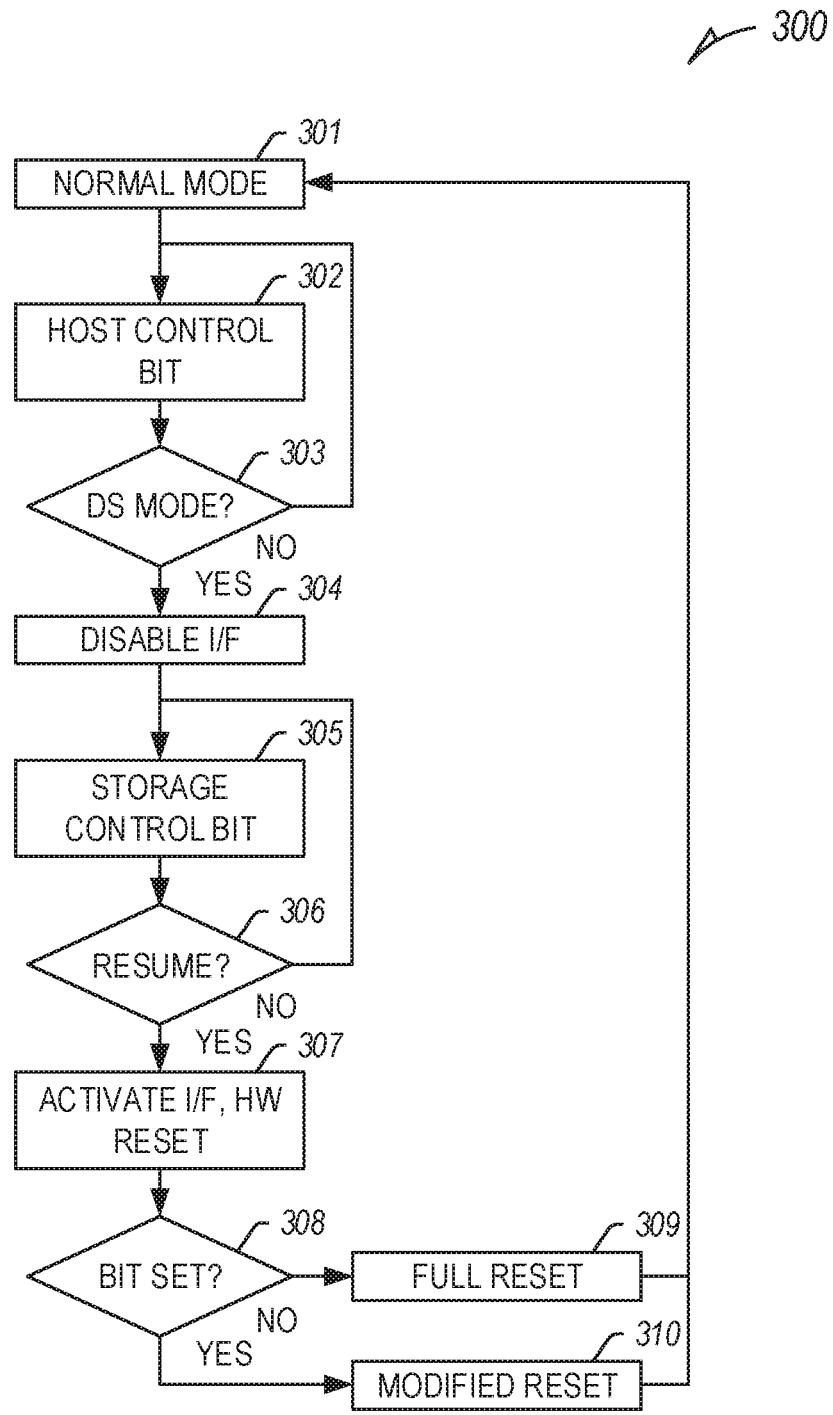
FIG. 3 illustrates generally an example method of a host system transitioning between different modes.

FIG. 3 illustrates generally an example method 300 of a host system transitioning from a normal mode, to a deep sleep (DS) mode, and then resuming the normal mode after a full or modified reset in response to a hardware (HW) reset signal and a state of a control bit in the storage system, such as described above.

At 301, the host system is in a normal mode, ready to perform operations, etc. At 302, while in the normal mode, a host device can control a control bit on the storage system, such as over a bidirectional communication interface. The state of the control bit can expand functionality of the hardware reset function of the storage system, such as enable more than one reset mode when resuming from deep sleep mode, etc. The host device can be configured to control the value written to the control bit on the storage system while the communication interface is enabled, or while the host system is in the normal mode, or not in the deep sleep mode, etc. To change the value, the host device can be configured to provide a write command to the storage system, such as to the memory controller, and the memory controller can be configured to write the received value to a register, flag, descriptor, or one or more other data unit of the storage system, on one or more of the non-volatile memory devices, the static memory, etc.

At 303, the host device can determine to enter a deep sleep mode. If the determination to enter the deep sleep mode is not made or received, process can return to 302, and the host device can control the control bit on the storage system. If the determination to enter the deep sleep mode is made or received at 303, the communication interface can be disabled at 304. While the communication interface between the host device and the storage system is disabled, the storage system can control the control bit at 305.

In an example, the storage system can retain the value written by the host device. In other examples, the storage system, such as the control circuitry, etc., can monitor one or more conditions of the storage system in the second mode, such as power loss, power supply voltage falling below one or more thresholds, etc. If such conditions are detected, or one or more other conditions that indicate the data stored on the storage system may not have been retained, the storage system (e.g., control circuitry, etc.) may erase, write, or overwrite the value written by the host device while the communication interface was active (or not written in the case of an empty bit state, etc.). In an example, the storage system can include one or more other voltage circuits, comparators, sample-and-hold circuits, etc., configured to monitor a voltage (e.g., a lowest voltage) on one or more power supplies of the storage system, such as while the communication interface is disabled or powered down, etc.

At 306, the host device can determine to resume the normal mode or exit the deep sleep mode. If the determination to resume the normal mode or exit the deep sleep mode is not made or received, process can return to 305, and the storage system can control the control bit. If the determination to resume the normal mode or exit the deep sleep mode is made or received at 306, a hardware reset signal can be provided to the storage system and the communication interface can be enabled at 307.

At 308, the storage system can determine if the control bit is set or not set. If the control bit is not set (e.g., if the bit value is "0"), either by the host device or subsequently by the storage system, a full reset can be performed by the storage system at 309 before process returns to the normal mode at 301. If the control bit is set (e.g., if the bit value is "1"), either by the host device or subsequently by the storage system, a modified reset, such as one or more modified reset configurations described above in FIG. 2 or otherwise, can be performed by the storage system at 310 before process returns to the normal mode at 301.

Figure 4:
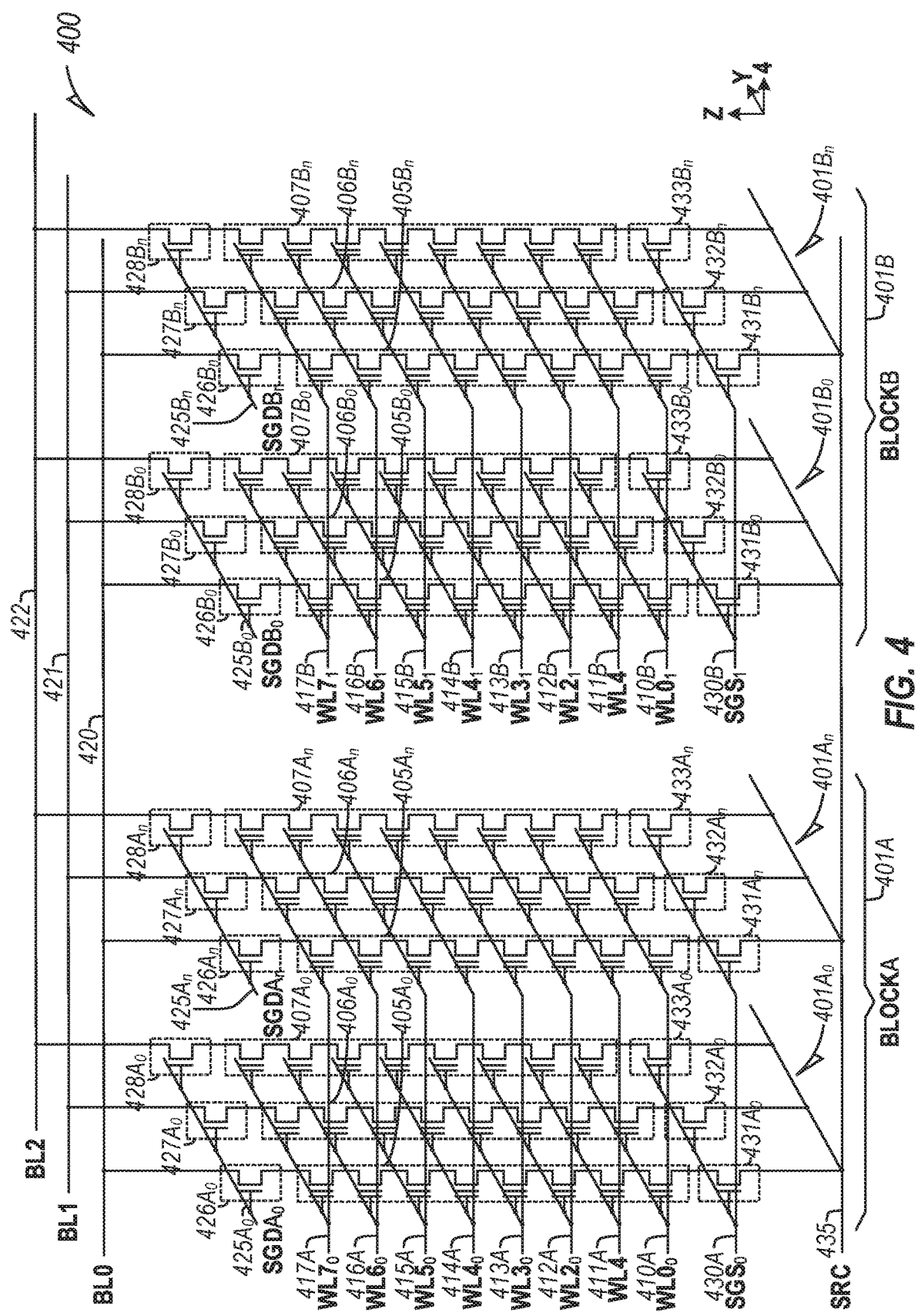
FIG. 4 illustrates an example schematic diagram of a 3D NAND architecture semiconductor memory array.

FIG. 4 illustrates an example schematic diagram of a 3D NAND architecture semiconductor memory array 400 including a number of strings of memory cells (e.g., first-third $A_0$ memory strings $405A_0$-$407A_0$, first-third $A_n$ memory strings $405A_n$-$407A_n$, first-third $B_0$ memory strings $405B_0$-$407B_0$, first-third $B_n$ memory strings $405B_n$-$407B_n$, etc.), organized in blocks (e.g., block A 401A, block B 401B, etc.) and sub-blocks (e.g., sub-block $A_0$ $401A_0$, sub-block $A_n$ $401A_n$, sub-block $B_0$ $401B_0$, sub-block $B_n$ $401B_n$, etc.). The memory array 400 represents a portion of a greater number of similar structures that would typically be found in a block, device, or other unit of a memory device.

Each string of memory cells includes a number of tiers of storage transistors (e.g., floating gate, replacement gate, charge trapping structures, etc.) stacked in the Z direction, source to drain, between a source line (SRC) 435 or a source-side select gate (SGS) (e.g., first-third $A_0$ SGS $431A_0$-$433A_0$, first-third $A_n$ SGS $431A_n$-$433A_n$, first-third $B_0$ SGS $431B_0$-$433B_0$, first-third $B_n$ SGS $431B_n$-$433B_n$, etc.) and a drain-side select gate (SGD) (e.g., first-third $A_0$ SGD $426A_0$-$428A_0$, first-third $A_n$ SGD $426A_n$-$428A_n$, first-third $B_0$ SGD $426B_0$-$428B_0$, first-third $B_n$ SGD $426B_n$-$428B_n$, etc.). Each string of memory cells in the 3D memory array can be arranged along the X direction as data lines (e.g., bit lines (BL) BL0-BL3 420-422), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 400 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 400 includes a control gate (CG) coupled to (e.g., electrically or otherwise operatively connected to) an access line (e.g., word lines (WL) $WL0_0$-$WL7_0$ 410A-417A, $WL0_1$-$WL7_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $426A_0$-$428A_0$ can be accessed using an $A_0$ SGD line $SGDA_0$ $425A_0$, first-third $A_n$ SGD $426A_n$-$428A_n$ can be accessed using an $A_n$ SGD line $SGDA_n$ $425A_n$, first-third $B_0$ SGD $426B_0$-$428B_0$ can be accessed using a $B_0$ SGD line $SGDB_0$ $425B_0$, and first-third $B_n$ SGD $426B_n$-$428B_n$ can be accessed using a $B_n$ SGD line $SGDB_n$ $425B_n$. First-third $A_0$ SGS $431A_0$-$433A_0$ and first-third $A_n$ SGS $431A_n$-$433A_n$ can be accessed using a gate select line $SGS_0$ 430A, and first-third $B_0$ SGS $431B_0$-$433B_0$ and first-third $B_n$ SGS $431B_n$-$433B_n$ can be accessed using a gate select line $SGS_1$ 430B.

In an example, the memory array 400 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL40), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
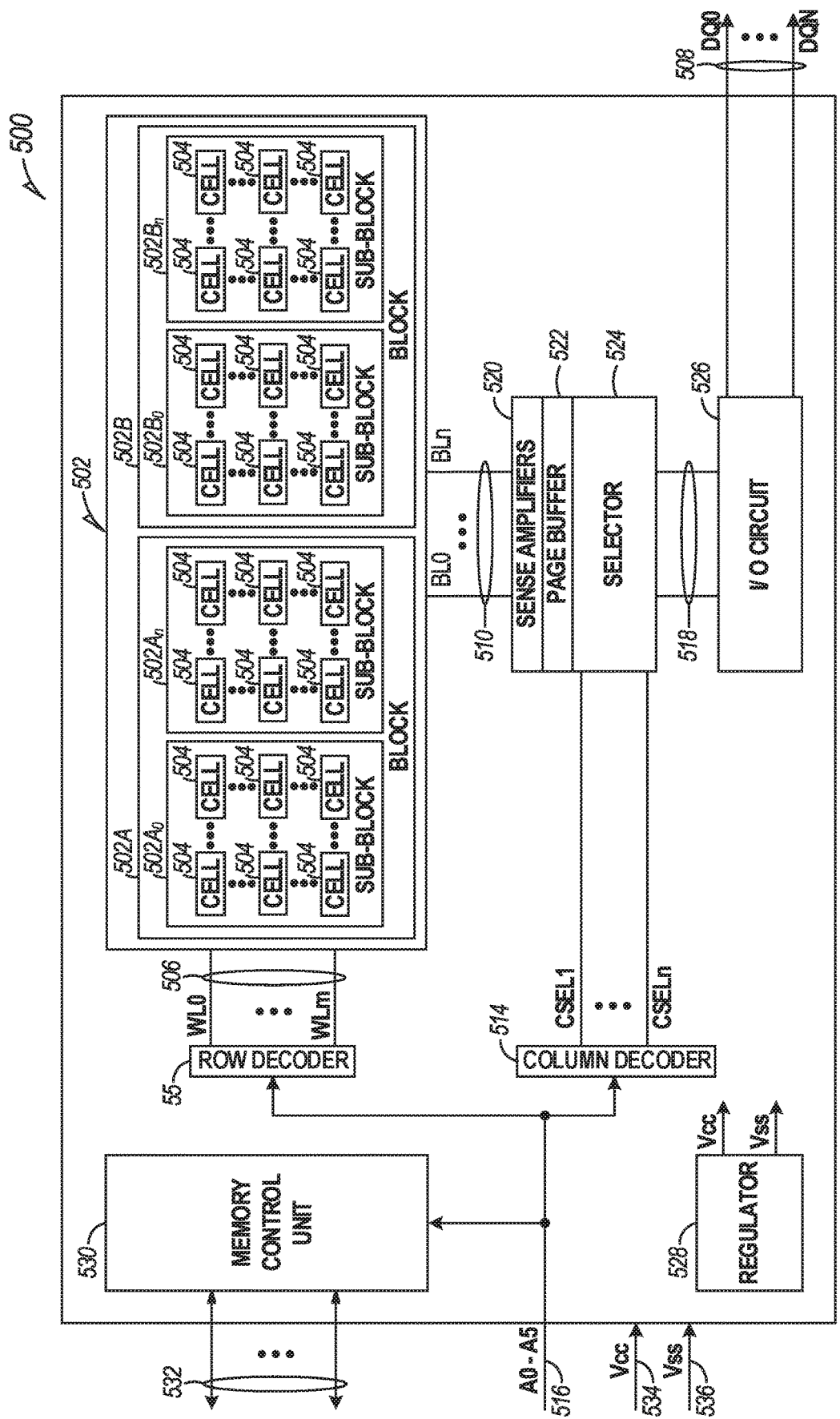
FIG. 5 illustrates an example block diagram of a memory module.

FIG. 5 illustrates an example block diagram of a memory device 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having a number of dies or LUNs, the memory device 500 can represent a block diagram of circuits and components for each die or LUN. The memory device 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502B. Each block can include sub-blocks. For example, the first block 502A can include first and second sub-blocks $502A_0$, $502A_n$, and the second block 502B can include first and second sub-blocks $502B_0$, $502B_n$. Each sub-block can include a number of physical pages, each page including a number of memory cells 504. Although illustrated herein as having two blocks, each block having two sub-blocks, and each sub-block having a number of memory cells 504, in other examples, the memory array 502 can include more or fewer blocks, sub-blocks, memory cells, etc. In other examples, the memory cells 504 can be arranged in a number of rows, columns, pages, sub-blocks, blocks, etc., and accessed using, for example, access lines 506, first data lines 510, or one or more select gates, source lines, etc.

The memory control unit 530 can control memory operations of the memory device 500 according to one or more signals or instructions received on control lines 532, including, for example, one or more clock signals or control signals that indicate a desired operation (e.g., write, read, erase, etc.), or address signals (A0-AX) received on one or more address lines 516. One or more devices external to the memory device 500 can control the values of the control signals on the control lines 532, or the address signals on the address line 516. Examples of devices external to the memory device 500 can include, but are not limited to, a host, a memory controller, a processor, or one or more circuits or components not illustrated in FIG. 5.

The memory device 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL0-WLm)) or the first data lines 510 (e.g., one or more of a plurality of bit lines (BL0-BLn)), such as described above.

The memory device 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the memory device 500 can communicate with the memory device 500 using the I/O lines (DQ0-DQN) 508, address lines 516 (A0-AX), or control lines 532. The input/output (I/O) circuit 526 can transfer values of data in or out of the memory device 500, such as in or out of the page buffer 522 or the memory array 502, using the I/O lines 508, according to, for example, the control lines 532 and address lines 516. The page buffer 522 can store data received from the one or more devices external to the memory device 500 before the data is programmed into relevant portions of the memory array 502, or can store data read from the memory array 502 before the data is transmitted to the one or more devices external to the memory device 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
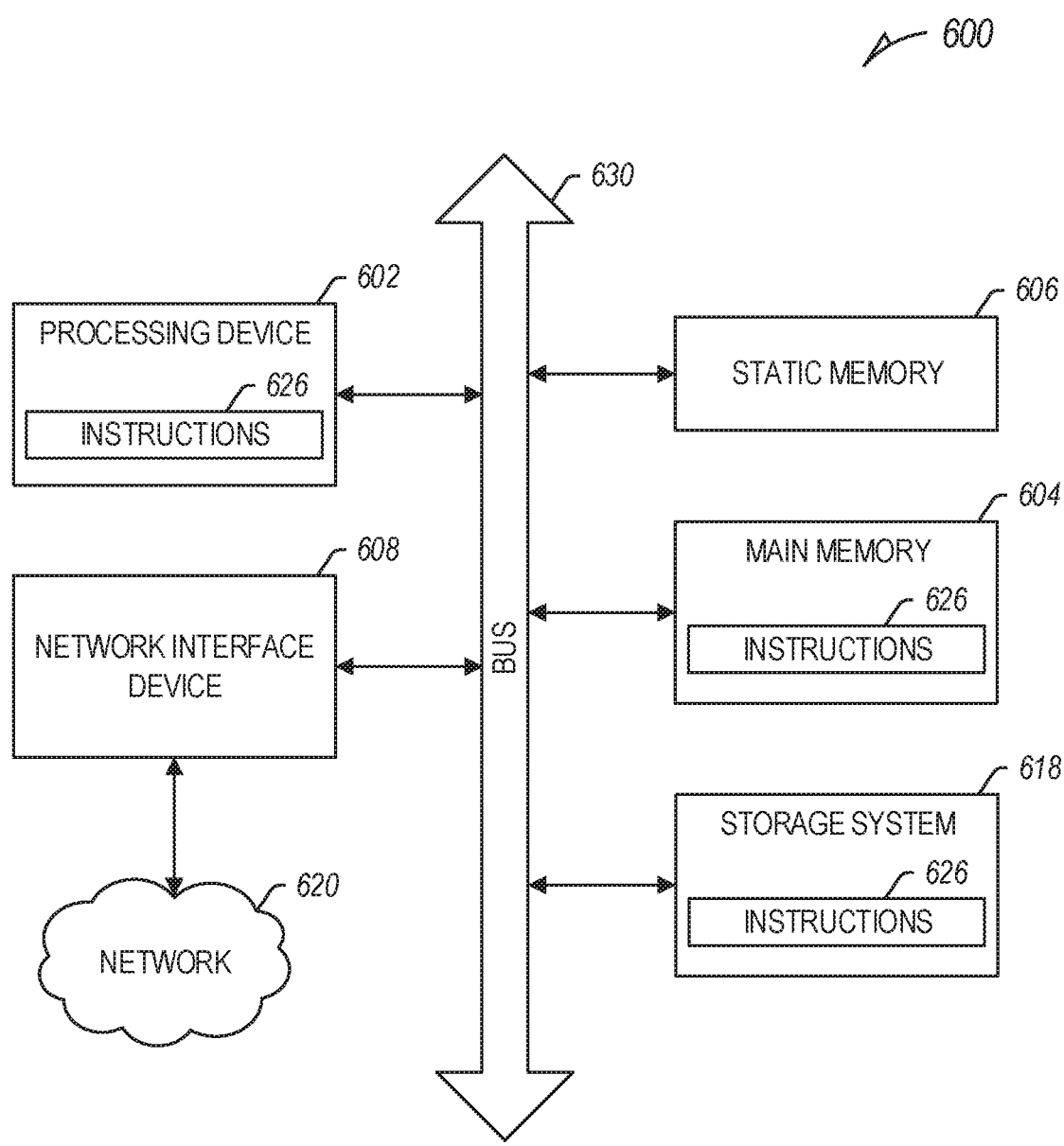
FIG. 6 illustrates an example block diagram of an information handling system.

FIG. 6 illustrates a block diagram of an example machine (e.g., a host system) 600 upon which any one or more of the techniques (e.g., methodologies) discussed herein may perform (e.g., such as those described in FIG. 1, etc.). In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Example 1 is a host system comprising: a host device comprising a host processor; a storage system comprising at least one non-volatile memory device, control circuitry coupled to the non-volatile memory device, and a storage register to store at least one control bit; and a communication interface between the host device and the storage system; and a reset interface between the host device and the storage system, wherein the host device is configured to control a power mode of the storage system, the power mode comprising an operational mode and a low power mode in which the communication interface is disabled, and wherein, in the low power mode, the control circuitry is configured to provide one of a first reset or a second reset to transition to the storage system from the low power mode to the operational power mode in response to a reset signal from the host device on the reset interface and a value of the at least one control bit.

In Example 2, the subject matter of Example 1 optionally includes wherein the first reset has a first latency and a first power requirement, wherein the second reset has a second latency and a second power requirement, and wherein the second latency is less than the first latency and the first power requirement is lower than the second power requirement.

In Example 3, the subject matter of any one or more of Examples 1-2 optionally include a bidirectional communication interface, wherein the host processor is configured to disable the bidirectional communication interface in the low power mode.

In Example 4, the subject matter of Example 3 optionally includes wherein the host processor is configured to enable the bidirectional communication interface in the operational power mode.

In Example 5, the subject matter of any one or more of Examples 1-4 optionally include wherein, in the operational power mode, the host processor is configured to control the value of the control bit, and wherein, in the low power mode, the control circuitry is configured to control the value of the control bit.

In Example 6, the subject matter of any one or more of Examples 1-5 optionally include wherein the operational power mode is a normal power mode and the low power mode is a deep sleep mode, wherein the first reset is a normal reset including re-initialization the control circuitry, the group of non-volatile memory cells, and wherein the second reset is a modified reset including a limited re-initialization of the storage system to decrease a time of the transition from the low power mode to the operational power mode.

In Example 7, the subject matter of any one or more of Examples 1-6 optionally include wherein the host device includes a USF host, wherein the storage system comprises UFS device, wherein the control bit comprises multiple control bits indicative of multiple different resets, and wherein, in the low power mode, the control circuitry is configured to provide one of the multiple resets in response to the hardware reset signal and the values of the multiple control bits.

Example 8 is a system comprising: a storage system comprising a group of non-volatile memory cells, control circuitry coupled to the group of non-volatile memory cells, and a control bit, the wherein, in an operational power mode of the storage system, the control circuitry is configured to communicate with a host device through a bidirectional communication interface; and wherein, in a low power mode of the storage system, the control circuitry is configured to provide one of a first reset or a second reset to transition to the storage system from the low power mode to the operational power mode in response to a hardware reset signal and a value of the control bit.

In Example 9, the subject matter of Example 8 optionally includes wherein, in the operational power mode of the storage system, the control bit is controlled by the host device through the bidirectional communication interface, wherein the storage system is configured to store a value on the control bit in response to a command from the host device, wherein, in the low power mode of the storage system, the bidirectional communication interface is disabled, and the control bit is controlled by the storage system, and wherein the low power mode is a lower-power mode than the operational power mode.

In Example 10, the subject matter of any one or more of Examples 8-9 optionally include wherein the first reset has a first latency and a first power requirement, wherein the second reset has a second latency and a second power requirement, and wherein the second latency is less than the first latency and the first power requirement is lower than the second power requirement.

In Example 11, the subject matter of any one or more of Examples 1-10 optionally include wherein the operational power mode is a normal power mode and the low power mode is a deep sleep mode, wherein the first reset is a normal reset including re-initialization of the control circuitry, the group of non-volatile memory cells, and wherein the second reset is a modified reset including a limited re-initialization of the storage system to decrease a time of the transition from the low power mode to the operational power mode.

In Example 12, the subject matter of any one or more of Examples 1-11 optionally include wherein the storage system comprises UFS device, wherein the control bit comprises multiple control bits indicative of multiple, different resets, and wherein, in the low power mode, the control circuitry is configured to provide one of the multiple resets in response to the hardware reset signal and the values of the multiple control bits.

Example 13 is a method implemented by control circuitry of a storage system, the method comprising: receiving, in a low power mode of the storage system, a hardware reset signal from a host device; and providing one of a first reset or a second reset to transition to the storage system from the low power mode to an operational power mode in response to the received hardware reset signal and a value of a control bit on the storage system.

In Example 14, the subject matter of Example 13 optionally includes wherein the low power mode is a lower-power mode than the operational power mode.

In Example 15, the subject matter of any one or more of Examples 13-14 optionally include wherein the first reset has a first latency and a first power requirement, wherein the second reset has a second latency and a second power requirement, and wherein the second latency is less than the first latency and the first power requirement is lower than the second power requirement.

In Example 16, the subject matter of any one or more of Examples 13-15 optionally include wherein the operational power mode is a normal power mode and the low power mode is a deep sleep mode, and wherein the first reset is a normal reset including re-initialization the control circuitry, the group of non-volatile memory cells, and wherein the second reset is a modified reset including a limited re-initialization of the storage system to decrease a time of the transition from the low power mode to the operational power mode.

In Example 17, the subject matter of any one or more of Examples 13-16 optionally include wherein the storage system comprises a UFS device, wherein the control bit comprises multiple control bits indicative of multiple different resets, and wherein, in the low power mode, the control circuitry is configured to provide one of the multiple resets in response to the hardware reset signal and the values of the multiple control bits.

Example 18 is a machine-readable medium, storing instructions, which when executed by a storage system, cause the storage system to perform operations comprising: receiving, in a low power mode of the storage system, a hardware reset signal from a host device; and providing one of a first reset or a second reset to transition to the storage system from the low power mode to an operational power mode in response to the received hardware reset signal and a value of a control bit on the storage system.

In Example 19, the subject matter of Example 18 optionally includes wherein the low power mode is a lower-power mode than the operational power mode.

In Example 20, the subject matter of any one or more of Examples 18-19 optionally include wherein the first reset has a first latency and a first power requirement, wherein the second reset has a second latency and a second power requirement, and wherein the second latency is less than the first latency and the first power requirement is lower than the second power requirement.

In Example 21, the subject matter of any one or more of Examples 18-20 optionally include wherein the operational power mode is a normal power mode and the low power mode is a deep sleep mode, and wherein the first reset is a normal reset including re-initialization the control circuitry, the group of non-volatile memory cells, and wherein the second reset is a modified reset including a limited re-initialization of the storage system to decrease a time of the transition from the low power mode to the operational power mode.

In Example 22, the subject matter of any one or more of Examples 18-21 optionally include wherein the storage system comprises a UFS device, wherein the control bit comprises multiple control bits indicative of multiple different resets, and wherein the operations further comprise: providing, in the low power mode, one of the multiple resets in response to the hardware reset signal and the values of the multiple control bits.

In Example 23, subject matter (e.g., a system or apparatus) may optionally combine any portion or combination of any portion of any one or more of Examples 1-21 to comprise "means for" performing any portion of any one or more of the functions or methods of Examples 1-21, or at least one "non-transitory machine-readable medium" including instructions that, when performed by a machine, cause the machine to perform any portion of any one or more of the functions or methods of Examples 1-21.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A host system comprising:
   a host device comprising a host processor;
   a storage system comprising at least one non-volatile memory device, control circuitry coupled to the non-volatile memory device, and a storage register to store at least one control bit; and
   a communication interface between the host device and the storage system; and
   a reset interface between the host device and the storage system,
   wherein the host device is configured to control a power mode of the storage system, the power mode comprising an operational mode and a low power mode in which the communication interface is disabled,
   wherein, in the low power mode, the control circuitry is configured to provide one of a first reset or a second reset to transition to the storage system from the low power mode to the operational power mode in response to a reset signal from the host device on the reset interface and a value of the at least one control bit,
   wherein, in the operational power mode, the host processor is configured to control the value of the at least one control bit, and
   wherein, in the low power mode, the control circuitry is configured to control the value of the at least one control bit.

2. The host system of claim 1,
   wherein the first reset has a first latency and a first power requirement,
   wherein the second reset has a second latency and a second power requirement, and
   wherein the second latency is less than the first latency and the first power requirement is lower than the second power requirement.

3. The host system of claim 1, comprising:
   a bidirectional communication interface, wherein the host processor is configured to disable the bidirectional communication interface in the low power mode.

4. The host system of claim 3, wherein the host processor is configured to enable the bidirectional communication interface in the operational power mode.

5. The host system of claim 1, wherein the operational power mode is a normal power mode and the low power mode is a deep sleep mode, wherein the first reset is a normal reset including re-initialization the control circuitry, the group of non-volatile memory cells, and wherein the second reset is a modified reset including a limited re-initialization of the storage system to decrease a time of the transition from the low power mode to the operational power mode.

6. The host system of claim 1, wherein the host device includes a USF host, wherein the storage system comprises UFS device, wherein the at least one control bit comprises multiple control bits indicative of multiple different resets, and wherein, in the low power mode, the control circuitry is configured to provide one of the multiple resets in response to the hardware reset signal and the values of the multiple control bits.

7. The host system of claim 1, wherein, in the low power mode, the control circuitry is configured to:
provide the first reset to transition the storage system from the low power mode to the operational power mode in response to the reset signal from the host device on the reset interface and the at least one control bit having a first value; and
provide the second reset to transition the storage system from the low power mode to the operational power mode in response to the reset signal from the host device on the reset interface and the at least one control bit having a second value.

8. A system comprising:
a storage system comprising a group of non-volatile memory cells, control circuitry coupled to the group of non-volatile memory cells, and at least one control bit,
wherein, in an operational power mode of the storage system, the control circuitry is configured to communicate with a host device through a bidirectional communication interface,
wherein, in a low power mode of the storage system, the control circuitry is configured to provide one of a first reset or a second reset to transition to the storage system from the low power mode to the operational power mode in response to a hardware reset signal and a value of the at least one control bit,
wherein the value of the at least one control bit is controlled by the host device in the operational power mode of the storage system and by the storage system in the low power mode of the storage system.

9. The system of claim 8, wherein, in the operational power mode of the storage system, the at least one control bit is controlled by the host device through the bidirectional communication interface, wherein the storage system is configured to store a value on the at least one control bit in response to a command from the host device, wherein, in the low power mode of the storage system, the bidirectional communication interface is disabled, and the at least one control bit is controlled by the storage system, and wherein the low power mode is a lower-power mode than the operational power mode.

10. The system of claim 8, wherein the first reset has a first latency and a first power requirement, wherein the second reset has a second latency and a second power requirement, and wherein the second latency is less than the first latency and the first power requirement is lower than the second power requirement.

11. The system of claim 8, wherein the operational power mode is a normal power mode and the low power mode is a deep sleep mode, wherein the first reset is a normal reset including re-initialization of the control circuitry, the group of non-volatile memory cells, and wherein the second reset is a modified reset including a limited re-initialization of the storage system to decrease a time of the transition from the low power mode to the operational power mode.

12. The system of claim 8, wherein the storage system comprises UFS device, wherein the at least one control bit comprises multiple control bits indicative of multiple, different resets, and wherein, in the low power mode, the control circuitry is configured to provide one of the multiple resets in response to the hardware reset signal and the values of the multiple control bits.

13. A method implemented by control circuitry of a storage system, the method comprising:
receiving, in a low power mode of the storage system, a hardware reset signal from a host device; and
providing one of a first reset or a second reset to transition to the storage system from the low power mode to an operational power mode in response to the received hardware reset signal and a value of at least one control bit on the storage system,
wherein the value of the at least one control bit is controlled by the host device in the operational power mode and the storage system in the low power mode.

14. The method of claim 13, wherein the low power mode is a lower-power mode than the operational power mode.

15. The method of claim 13, wherein the first reset has a first latency and a first power requirement, wherein the second reset has a second latency and a second power requirement, and wherein the second latency is less than the first latency and the first power requirement is lower than the second power requirement.

16. The method of claim 13, wherein the operational power mode is a normal power mode and the low power mode is a deep sleep mode, and wherein the first reset is a normal reset including re-initialization the control circuitry, the group of non-volatile memory cells, and wherein the second reset is a modified reset including a limited re-initialization of the storage system to decrease a time of the transition from the low power mode to the operational power mode.

17. The method of claim 13, wherein the storage system comprises a UFS device, wherein the at least one control bit comprises multiple control bits indicative of multiple different resets, and wherein, in the low power mode, the control circuitry is configured to provide one of the multiple resets in response to the hardware reset signal and the values of the multiple control bits.

18. A non-transitory machine-readable medium, storing instructions, which when executed by a storage system, cause the storage system to perform operations comprising:
receiving, in a low power mode of the storage system, a hardware reset signal from a host device; and
providing one of a first reset or a second reset to transition to the storage system from the low power mode to an operational power mode in response to the received hardware reset signal and a value of at least one control bit on the storage system,
wherein the value of the at least one control bit is controlled by the host device in the operational power mode and the storage system in the low power mode.

19. The machine-readable medium of claim 18, wherein the low power mode is a lower-power mode than the operational power mode.

20. The machine-readable medium of claim 18, wherein the first reset has a first latency and a first power requirement,
wherein the second reset has a second latency and a second power requirement, and
wherein the second latency is less than the first latency and the first power requirement is lower than the second power requirement.

21. The machine-readable medium of claim 18,
wherein the operational power mode is a normal power mode and the low power mode is a deep sleep mode, and
wherein the first reset is a normal reset including re-initialization the control circuitry, the group of non-volatile memory cells, and
wherein the second reset is a modified reset including a limited re-initialization of the storage system to decrease a time of the transition from the low power mode to the operational power mode.

22. The machine-readable medium of claim 18,
wherein the storage system comprises a UFS device,
wherein the at least one control bit comprises multiple control bits indicative of multiple different resets, and
wherein the operations further comprise:
providing, in the low power mode, one of the multiple resets in response to the hardware reset signal and the values of the multiple control bits.

* * * * *